(12) United States Patent
Lee

(10) Patent No.: US 8,544,533 B2
(45) Date of Patent: Oct. 1, 2013

(54) VEHICULAR AIR CONDITIONER HAVING TWO-LAYERED AIR FLOW

(75) Inventor: Jaehoon Lee, Daejeon-si (KR)

(73) Assignee: Halla Climate Control Corporation, Daejeon-si (KR)

( * ) Notice: Subject to any disclaimer, the term of this patent is extended or adjusted under 35 U.S.C. 154(b) by 1401 days.

(21) Appl. No.: 12/088,122

(22) PCT Filed: Nov. 6, 2006

(86) PCT No.: PCT/KR2006/004599
§ 371 (c)(1),
(2), (4) Date: Mar. 26, 2008

(87) PCT Pub. No.: WO2007/055499
PCT Pub. Date: May 18, 2007

(65) Prior Publication Data
US 2008/0223546 A1    Sep. 18, 2008

(30) Foreign Application Priority Data

Nov. 10, 2005  (KR) .................. 10-2005-0107585
Feb. 8, 2006   (KR) .................. 10-2006-0012041

(51) Int. Cl.
*B60H 1/00*    (2006.01)
*B60H 3/00*    (2006.01)

(52) U.S. Cl.
USPC .............. 165/202; 165/42; 454/141; 454/156

(58) Field of Classification Search
USPC ....... 165/42, 43, 44, 202, 203, 204; 454/121, 454/141, 156; 237/12.3 A, 12.3 B, 12, 4
See application file for complete search history.

(56) References Cited

U.S. PATENT DOCUMENTS

| | | | | |
|---|---|---|---|---|
| 1,906,704 A * | 5/1933 | McCoy | ................ | 237/12.4 |
| 1,961,612 A * | 6/1934 | Knight | ................ | 454/305 |
| 3,264,971 A * | 8/1966 | Dangauthier | ................ | 454/154 |
| 4,117,772 A * | 10/1978 | Specht | ................ | 454/145 |
| 4,406,214 A * | 9/1983 | Sakurai | ................ | 237/12.3 A |
| 4,610,196 A * | 9/1986 | Kern | ................ | 454/127 |
| 4,742,762 A * | 5/1988 | Ito et al. | ................ | 165/42 |
| 4,750,410 A * | 6/1988 | Parker | ................ | 454/155 |
| 4,852,638 A * | 8/1989 | Hildebrand et al. | ........ | 165/42 |
| 4,938,122 A * | 7/1990 | Ziemba | ................ | 454/145 |
| 4,940,083 A * | 7/1990 | Takenaka et al. | ........ | 165/42 |
| 4,947,735 A * | 8/1990 | Guillemin | ................ | 454/141 |
| 5,106,018 A * | 4/1992 | Loup | ................ | 237/12.3 B |
| 5,228,475 A * | 7/1993 | Trill | ................ | 137/875 |
| 5,476,418 A * | 12/1995 | Loup | ................ | 454/121 |
| 5,601,142 A * | 2/1997 | Hildebrand et al. | ........ | 165/42 |
| 5,752,877 A * | 5/1998 | Sun | ................ | 454/155 |
| 5,902,181 A * | 5/1999 | Bain | ................ | 454/144 |
| 5,947,813 A * | 9/1999 | Chow et al. | ................ | 454/155 |

(Continued)

FOREIGN PATENT DOCUMENTS

| | | |
|---|---|---|
| JP | 2004-136772 | 5/2004 |
| JP | 2005-231511 A | 9/2005 |

(Continued)

*Primary Examiner* — Ljiljana Ciric
(74) *Attorney, Agent, or Firm* — Fulbright & Jaworski LLP

(57) ABSTRACT

An air conditioner for vehicles having a two layer air flow structure which uses one temperature control door for adjusting the temperature and serving as a partition wall for the two-layer air flow structure.

2 Claims, 9 Drawing Sheets

(56) References Cited

U.S. PATENT DOCUMENTS

| | | | |
|---|---|---|---|
| 5,967,890 A * | 10/1999 | Loup et al. | 454/121 |
| 5,983,987 A * | 11/1999 | Weindorf | 165/42 |
| 5,988,263 A * | 11/1999 | Schwarz | 165/41 |
| 6,059,653 A * | 5/2000 | Gehring et al. | 454/155 |
| 6,244,335 B1 * | 6/2001 | Nakamura et al. | 165/203 |
| 6,431,257 B1 * | 8/2002 | Sano et al. | 165/42 |
| 6,431,267 B1 * | 8/2002 | Tanaka | 165/204 |
| 6,450,246 B1 * | 9/2002 | Kurokawa et al. | 165/42 |
| 6,484,755 B1 * | 11/2002 | Schwarz | 454/156 |
| 6,520,850 B1 * | 2/2003 | Buckman et al. | 454/121 |
| 6,588,496 B2 * | 7/2003 | Nakagawa et al. | 165/42 |
| 6,622,787 B1 * | 9/2003 | Toyoshima et al. | 165/203 |
| 6,668,909 B2 * | 12/2003 | Vincent | 165/42 |
| 6,739,149 B2 * | 5/2004 | Kang et al. | 165/42 |
| 6,772,833 B2 * | 8/2004 | Auer et al. | 165/203 |
| 6,814,138 B2 * | 11/2004 | Tsurushima et al. | 165/202 |
| 6,889,761 B2 * | 5/2005 | Perry et al. | 165/202 |
| 7,063,612 B2 * | 6/2006 | Kaszycki | 454/121 |
| 7,134,487 B2 * | 11/2006 | Kachi | 165/204 |
| 7,281,574 B2 * | 10/2007 | Shibata et al. | 165/203 |
| 7,407,001 B2 * | 8/2008 | Newman et al. | 165/202 |
| 7,464,749 B2 * | 12/2008 | Okumura et al. | 165/204 |
| 7,475,720 B2 * | 1/2009 | Kusaka | 165/204 |
| 7,540,322 B2 * | 6/2009 | Kang et al. | 165/203 |
| 7,563,159 B2 * | 7/2009 | Newman et al. | 454/156 |
| 7,694,729 B2 * | 4/2010 | Uemura | 165/203 |
| 7,793,706 B2 * | 9/2010 | Archibald et al. | 165/42 |
| 7,798,207 B2 * | 9/2010 | Tarukawa | 165/202 |
| 7,878,235 B2 * | 2/2011 | Park et al. | 165/204 |
| 7,950,444 B2 * | 5/2011 | Masatsugu | 165/42 |
| D663,397 S * | 7/2012 | Yeung | D23/324 |
| 8,302,669 B2 * | 11/2012 | Kiel et al. | 165/42 |
| 8,376,819 B2 * | 2/2013 | Vincent et al. | 454/156 |
| 8,424,776 B2 * | 4/2013 | Veettil et al. | 237/12.3 A |
| 2003/0037918 A1 * | 2/2003 | Lee et al. | 165/202 |
| 2003/0042011 A1 * | 3/2003 | Vincent | 165/203 |
| 2003/0045224 A1 * | 3/2003 | Vincent | 454/156 |
| 2003/0116303 A1 * | 6/2003 | Kang et al. | 165/42 |
| 2004/0016537 A1 * | 1/2004 | Nakamura et al. | 165/204 |
| 2004/0093884 A1 * | 5/2004 | Seki et al. | 165/42 |
| 2004/0152410 A1 * | 8/2004 | Seki | 454/139 |
| 2007/0181295 A1 * | 8/2007 | Masatsugu | 165/202 |

FOREIGN PATENT DOCUMENTS

| | | |
|---|---|---|
| JP | 2006-168432 A | 6/2006 |
| KR | 2003 0029259 A | 4/2003 |
| KR | 10-2003-0035511 A | 5/2003 |
| KR | 2003 0048557 A | 6/2003 |

\* cited by examiner

Prior Art

VEHICULAR AIR CONDITIONER HAVING TWO-LAYERED AIR FLOW

This application is a §371 of PCT/KR2006/004599 filed Nov. 6, 2006, which claims priority from Korean Patent Application No. 10-2005-0107585 filed Nov. 10, 2005, and Korean Patent Application No. 10-2006-0012041 filed Feb. 8, 2006.

TECHNICAL FIELD

The present invention relates to an air conditioner for vehicles having a two layer air flow structure, and more particularly, to an air conditioner having a two-layer air flow structure for vehicles, which uses one temperature control door adjusting temperature and serving as a partition wall for the two-layer air flow structure, thereby reducing manufacturing costs since its structure and operation method are simple, providing easiness in adjusting temperature, and improving sealing efficiency between an air conditioning case and the temperature control door.

BACKGROUND ART

In general, an air conditioner for vehicles is a car trim, which is installed in the vehicle in order to secure a driver's front and rear visual field by heating and cooling the inside of the vehicle in the summer season or the winter season or removing frost from a windshield in case of rain or the winter season. Since such air conditioner includes a heating device and a cooling device together, the air conditioner heats, cools or ventilates the inside of the vehicle through the steps of selectively inducing the indoor air or the outdoor air through a blast unit, heating or cooling the air, and blowing into the vehicle.

Such an air conditioner is classified into a three-piece type where a blast unit, an evaporator unit, and a heater core unit are disposed independently, a semi-center type where the evaporator unit and the heater core unit are embedded in an air conditioning case and the blast unit is mounted separately, and a center-mounting type where the three units are all embedded in the air conditioning case.

Furthermore, an air conditioner having a two-layer air flow structure has been developed to secure a defogging efficiency during heating and to maintain a heating efficiency of high quality. That is, the conventional air conditioner for the vehicles introduces cold outdoor air of low humidity thereto since the cold outdoor air is effective to remove frost stained on a window of the vehicle during heating and traveling in the winter season, but it causes lowering of the room temperature. In the above case, the air conditioner having the two-layer air flow structure realizes a two-layer air flow of indoor air and outdoor air that the outdoor air is supplied to the upper part of the vehicle and the indoor air is circulated in the lower part of the vehicle, whereby the air conditioner can effectively remove frost using fresh outdoor air of low humidity supplied to the upper part, provide fresh outdoor air to passengers and a driver, and maintain the heating efficiency of high quality by supplying warm indoor air to the lower part of the vehicle.

Referring to FIG. 1, the air conditioner having the two-layer air flow structure will be described in brief as follows.

As shown in the drawing, the air conditioner 1 having the two-layer air flow structure includes: an air conditioning case 10 having an air passageway 10a of a predetermined form formed therein by a partition wall 10b, an indoor air inlet 14a and an outdoor air inlet 14b formed at an entrance side of the air passageway 10a and divided from each other by a partition wall 14c, and a number of air vents 15 formed on an exit side of the air passageway 10a. Here, the air vents include a defrost vent 16, a face vent 17, a front floor vent 18, a rear floor vent 19, and so on.

A blower unit 5 is mounted on an entrance side of the air conditioning case 10, and includes: a first blast fan 6 for sending outdoor air to the outdoor air inlet 14b; and a second blast fan 7 for sending indoor air to the indoor air inlet 14a.

Inside the air conditioning case 10, an evaporator 2 and a heater core 3 are respectively mounted at a predetermined interval from the indoor and outdoor air inlets 14a and 14b. In front of the heater core 3, first and second temperature control doors 11 and 12 are mounted for selectively opening and closing a front air passageway 10c of the heater core 3 and an upper air passageway 10d.

Here, the second temperature control door 12 has the rear end portion rotatably mounted at a central height of the heater core 3 so as to open and close the heater core 3 from the center to the lower portion. In this instance, a free end portion of the second temperature control door 12 rotates to a central portion of the evaporator 2 corresponding to the partition wall 14c to divide the outdoor air and the indoor air from each other.

In addition, the first temperature control door 11 has the rear end portion rotatably mounted at the upper end portion of the heater core 3 and a free end portion overlapped with, a partition wall of the upper air passageway 10d or the second temperature control door 12 to selectively open and close the heater core 3 from the center to the upper portion and the upper air passageway 10d. Moreover, the first and second temperature control doors 11 and 12 are rotatably operated in interlock with each other by an actuator (not shown).

Meanwhile, a number of mode doors 13 are mounted on the exit side of the air passageway 10a to control air flowing toward the air vents 15.

Therefore, in a two-layer air flow mode, as shown in FIG. 1, the first temperature control door 11 closes the upstream side air passageway 10d of the heater core 3 and the free end portion of the second temperature control door 12 rotates to the central portion of the evaporator 2, so that the indoor air and the outdoor air introduced in their separated state through the indoor air and outdoor air inlets 14a and 14b flow to the evaporator 2 and the heater core 3 in the separated state, and then, the outdoor air flows toward the defrost vent 16 or the face vent 17 and the indoor air flows toward the front floor vent 18 or the real floor vent 19, whereby the air conditioner can secure a defogging efficiency and keep an improved heating performance.

However, the conventional air conditioner 1 adjusts temperature by using the two temperature control doors 11 and 12 and has to simultaneously operate the two temperature control doors 11 and 12 in interlock with each other to realize the two-layer air flow structure. So, the conventional air conditioner 1 has a problem in that its structure is complicated and manufacturing costs are increased due to the complicated components.

DISCLOSURE OF INVENTION

Technical Problem

Accordingly, the present invention has been made to solve the above-mentioned problems occurring in the prior art, and it is an object of the present invention to provide an air conditioner having a two-layer air flow structure for vehicles, which uses one temperature control door adjusting temperature and serving as a partition wall for the two-layer air flow structure, thereby reducing manufacturing costs since its structure and operation method are simple, providing easiness in adjusting temperature, and improving sealing efficiency between an air conditioning case and the temperature control door.

Technical Solution

To accomplish the above object, according to the present invention, there is provided an air conditioner having a two-layer air flow structure for vehicles, which includes: an air conditioning case having an air passageway formed therein, indoor air and outdoor air inlets formed at an entrance side of the air passageway and divided into two layers; and a plurality of air vents formed at an exist side of the air passageway; an evaporator and a heater core mounted on the air passageway of the downstream side of the indoor air and the outdoor air inlets in order in such a manner as to be spaced apart from each other by a predetermined interval; and a temperature control door rotatably mounted on the air passageway located between the evaporator and the heater core for adjusting temperature by inducing air passed through the evaporator to pass through or bypass the heater core, whereby indoor air and outdoor air flow through the air passageway in their separated state in a two-layer air flow mode, wherein the temperature control door includes: a rotary shaft rotatably mounted on the air conditioning ease; plates respectively formed on both sides of the rotary shaft; and an air flow channel formed on the outer surface of one plate to allow the indoor air and the outdoor air passed through the evaporator to pass through the heater core in their separated state in the two-layer air flow mode.

Advantageous Effects

The present invention is simple in its structure and operation method, reduces manufacturing costs, and provides easiness in adjustment of temperature since it uses only one temperature control door which adjusts temperature and serves as a separation wall for the two-layer air flow structure.

Moreover, the present invention can prevent a reduction of an air volume in a cooling mode since a cold air bypass passageway is additionally formed on the downstream side of an evaporator.

Furthermore, the present invention can prevent an air leakage since it has leak preventing device formed between a side wall of the temperature control door and the inner surface of an air conditioning case.

In addition, the present invention can improve a sealing efficiency between the air conditioning case and the temperature control door by allowing the upper side edge to be in contact with a partition wall of the air conditioning case, which forms an air passageway, when the air passageway bypassing a heater core is closed, since an auxiliary plate is formed inclinedly with respect to a plate.

MODE FOR THE INVENTION

Reference will be now made in detail to the preferred embodiment of the present invention with reference to the attached drawings.

In the present invention, description of the same configuration and action as the prior arts will be omitted.

Figure 2:
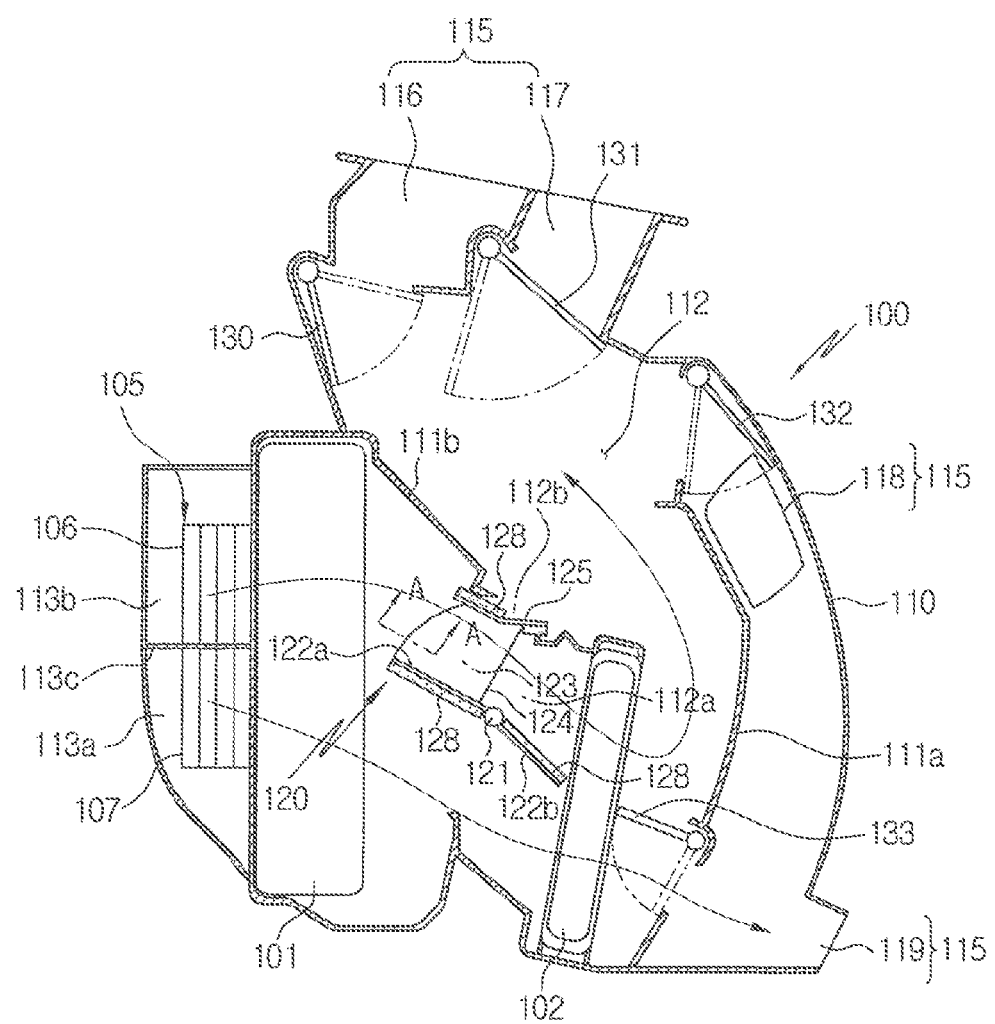
FIG. 2 is a sectional view of an air conditioner having a two-layer air flow structure according to a first preferred embodiment of the present invention in a two-layer air flow mode.
Figure 3:
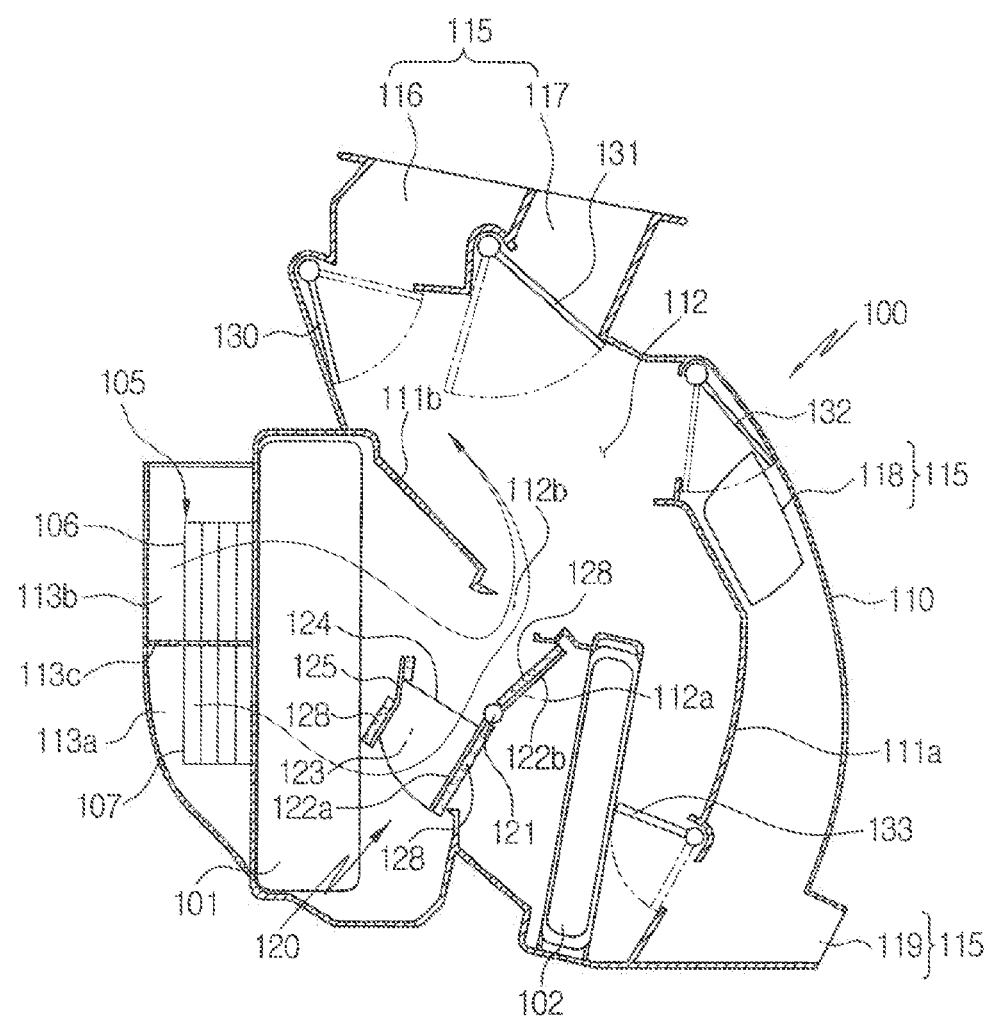
FIG. 3 is a sectional view of an air conditioner having a two-layer air flow structure according to the first preferred embodiment of the present invention in a cooling mode.
Figure 4:
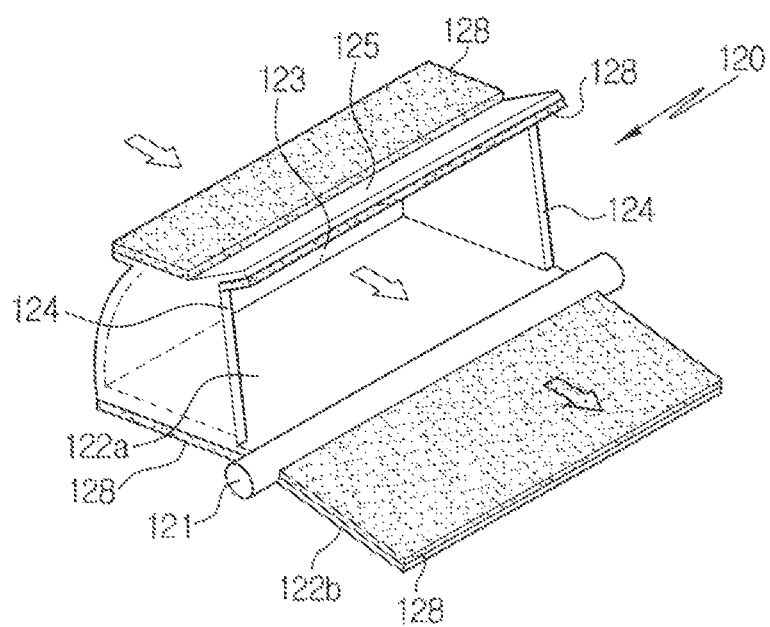
FIG. 4 is a perspective view of a temperature control door of the air conditioner having the two-layer air flow structure according to the first preferred embodiment of the present invention.
Figure 5:
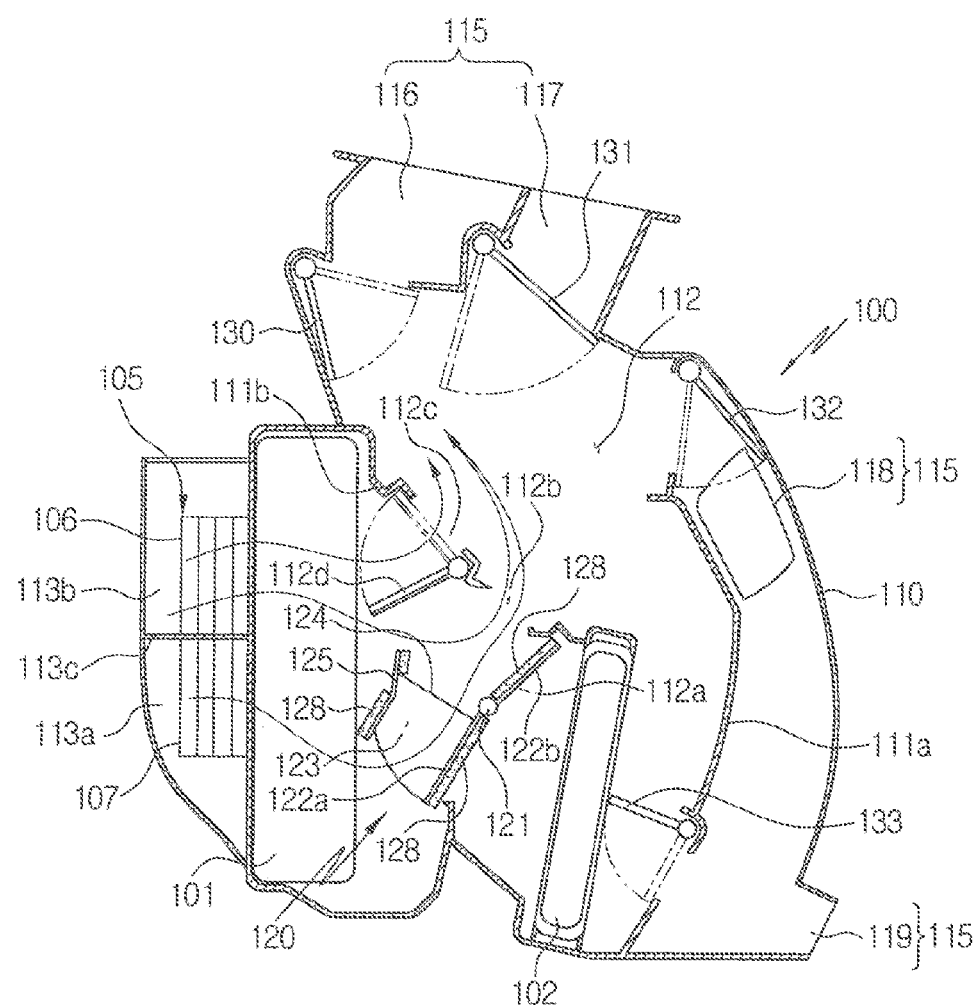
FIG. 5 is a sectional view showing a state where a cold air bypass passageway is formed in the air conditioner having the two-layer air flow structure in the cooling mode.
Figure 6:
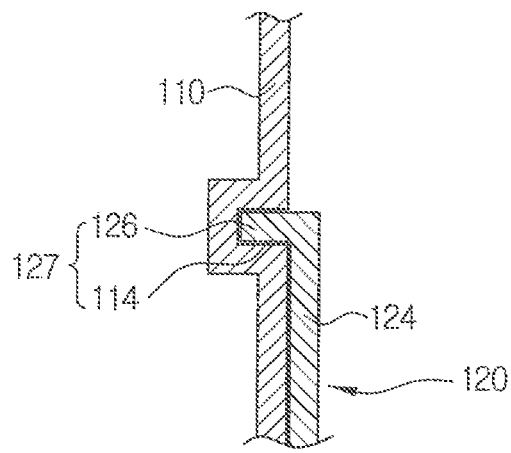
FIG. 6 is a sectional view taken along the line of A-A of FIG. 2.
Figure 7:
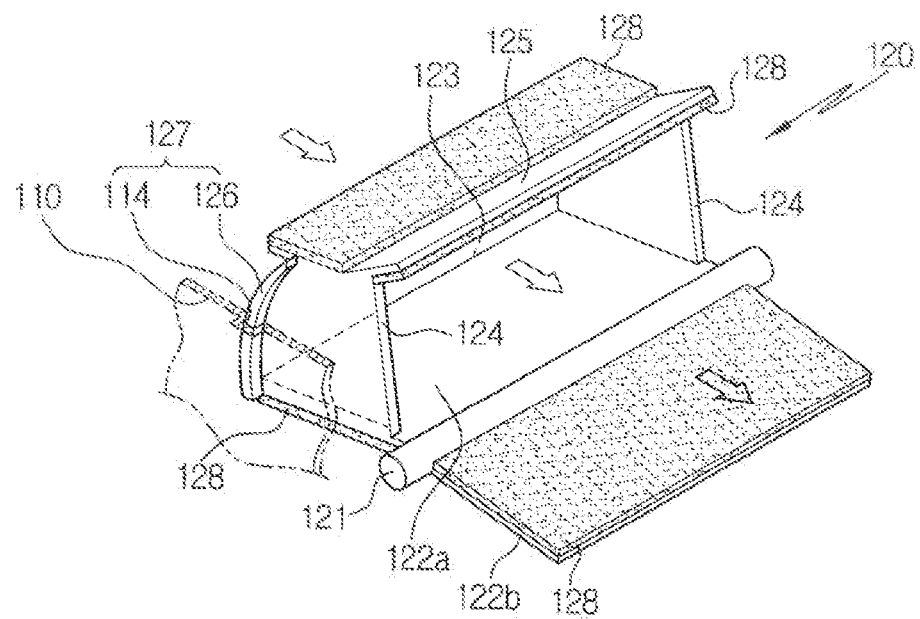
FIG. 7 is a perspective view showing a state where leak preventing device is formed between the temperature control door and an air conditioning case in the air conditioner having the two-layer air flow structure.

FIG. 2 is a sectional view of an air conditioner having a two-layer air flow structure according to a first preferred embodiment of the present invention in a two-layer air flow mode, FIG. 3 is a sectional view of an air conditioner having a two-layer air flow structure according to the first preferred embodiment of the present invention in a cooling mode, FIG. 4 is a perspective view of a temperature control door of the air conditioner having the two-layer air flow structure according to the first preferred embodiment of the present invention, FIG. 5 is a sectional view showing a state where a cold air bypass passageway is formed in the air conditioner having the two-layer air flow structure in the cooling mode, FIG. 6 is a sectional view taken along the line of A-A of FIG. 2, and FIG. 7 is a perspective view showing a state where leak preventing device is formed between the temperature control door and an air conditioning case in the air conditioner having the two-layer air flow structure.

As shown in the drawings, the air conditioner 100 according to the present invention includes an air conditioning case 110 having an air passageway 112 formed therein, an indoor air inlet 113a and an outdoor air inlet 113b respectively formed at an entrance side of the air passageway 112 so as to be divided into two layers by a partition wall 113c, and a number of air vents 115 formed at an exit side of the air passageway 112.

Here, the air vents 115 include a defrost vent 116, a face vent 117, a front floor vent 118, and a rear floor vent 119, and are connected with parts disposed inside the vehicle to discharge air. Meanwhile, the rear floor vent 119 may be omitted.

In addition, inside the air conditioning case 110, an evaporator 101 and a heater core 102 are mounted on the air passageway 112 of the downstream sides of the indoor and outdoor air inlets 113a and 113b in order in such a manner as to be spaced apart from each other by a predetermined interval.

Meanwhile, partition walls 111a and 111b are formed inside the air conditioning case 110 in various forms to guide air, which passed through the evaporator 101 or the heater core 102, toward each air vent 115.

That is, the partition wall 111a for dividing the air passageway 112 into the front and rear parts is formed on the rear side of the heater core 102, so that the air flowing toward the defrost vent 116 and the face vent 117 after passing the heater core 102 is divided from the air flowing toward the front floor vent 118 and the rear floor vent 119 by the partition wall 111a. Here, the upper and lower portions of the partition wall 111a are respectively opened, and to open and close the opened portions of the partition wall 111a, a front floor door 132 and a rear floor door 133 are respectively mounted on the opened portions.

Furthermore, an air passageway 112a passing through the heater core 102 and another air passageway 112b bypassing the heater core 102 are formed between the evaporator 101 and the heater core 102, and in this instance, the air passageway 112b bypassing the heater core 102 is formed on the partition wall 111h formed to connect the top of the evaporator 101 and the top of the heater core 102 with each other. Therefore, the air passed through the evaporator 101 passes through or bypasses the heater core 102 by a temperature control door 120, which will be described later.

Meanwhile, a blower unit 105 is mounted on the entrance side of the air conditioning case 110, and includes: a first blast fan 106 rotated by a motor (not shown) and sending the outdoor air toward the outdoor air inlet 113b of the air conditioning case 110; and a second blast fan 107 sending the indoor air toward the indoor air inlet 113a of the air conditioning case 110.

Of course, the blower unit 105 may introduce the indoor air and outdoor air only in the two-layer air flow mode, but selectively introduce the indoor air or the outdoor air according to a passenger's manipulation in a normal mode.

Furthermore, a number of mode doors are provided to adjust air discharged to the defrost vent 116, the face vent 117, the front floor vent 118, and the rear floor vent 119.

The mode doors include a defrost door 130 and a face door 131 for adjusting air flowing toward the defrost vent 116 and the face vent 117, and the front floor door 132 and the rear floor door 133 respectively mounted on the upper and lower portions of the partition wall 111a formed on the rear side of the heater core 102 for adjusting air flowing toward the front floor vent 118 and the rear floor vent 119.

Here, in the two-layer air flow mode, a free end portion of the rear floor door 133 rotates to the central portion of the heater core 102 to divide the air passageway 112 of the downstream side of the heater core 102 into upper and lower layers, whereby the outdoor air is introduced to the defrost vent 116 and the face vent 117 and the indoor air is introduced to the rear floor vent 119 and the front floor vent 118.

The temperature control door 120 is rotatably mounted on the air passageway formed between the evaporator 101 and the heater core 102 to adjust temperature by inducing the air passed through the evaporator 101 to pass through or bypass the heater core 102.

The temperature control door 120 includes a rotary shaft 121 rotatably mounted inside the air conditioning case 110 and a pair of plates 122a and 122b formed on both sides of the rotary shaft 121 in the opposite directions.

In addition, in the two-layer air flow mode, an air flow channel 123 is formed on the outer surface of one plate 122a to pass the indoor air and the outdoor air through the heater core 102 in the separated state after passing through the evaporator 101. It is preferable that the air flow channel 123 is formed on the plate 122a formed toward the evaporator 101.

Here, it is preferable that the rotary shaft 121 is mounted at a central position between the evaporator 101 and the heater core 102 and free end portions of the plates 122a and 122b are mounted to be arranged at the central portions of the evaporator 101 and the heater core 102. So, the plates 122a and 122b formed on both sides of the rotary shaft 121 in the opposite directions are bent to each other at a predetermined angle.

Additionally, the air flow channel 123 is defined by side walls 124 vertically formed on both side edges of the plate 122a and an auxiliary plate 125 formed on end portions of the side walls 124 to open and close the air passageway 112b bypassing the heater core 102. That is, the air flow channel 123 is formed in such a way that the plate 122a, the both side walls 124 and the auxiliary plate 125 together form a duct shape.

Here, the auxiliary plate 125 is bent at the center thereof at a predetermined angle. That is, the auxiliary plate 125 has a side, which is in parallel with the plate 122a, and the other side, which is bent from the center of the auxiliary plate 125 at the predetermined angle. Therefore, when the temperature control door 120 rotates to close the air passageway 112b bypassing the heater core 102, the bent side of the auxiliary plate 125 passes over the air passageway 112b and is in close contact with the partition wall 111b without being caught to the partition wall 111b of the air conditioning case 110 having the air passageway 112b, and the other side of the auxiliary plate 125 which is in parallel with the plate 122a is in close contact with the partition wall 111b without passing over the air passageway 112b.

Meanwhile, it is preferable that sealing members 128 are attached on sides of the plates 122a and 122b and the auxiliary plate 125, which are in contact with the partition wall 111b of the air conditioning case 110, to prevent air leakage when the air passageways 112a and 112b are opened and closed. In this instance, since the bent side of the auxiliary plate 125 passes over the air passageway 112b and is in close contact with the partition wall 111b and the other side of the auxiliary plate 125 is in close contact with the partition wall 111b without passing over the air passageway 112b, the sealing members 128 are separately attached on the upper and lower sides of the auxiliary plates 125.

As described above, the temperature control door 120 according to the present invention can adjust temperature and serve as the partition wall for realizing the two-layer air flow.

That is, in the normal air conditioning mode, the temperature control door 120 adjusts temperature by controlling an air amount passing through or bypassing the heater core 102 after passing through the evaporator 101.

In addition, in the two-layer air flow mode, the plates 122a and 122b of the temperature control door 120 serve as partition walls for dividing the air passageway located between the evaporator 101 and the heater core 102 into the upper and lower layers and the auxiliary plate 125 closes the air passageway 112b bypassing the heater core 102, whereby the indoor air passing through the evaporator 101 is discharged to the rear floor vent 119 and the front floor vent 118 after passing through the heater core 102 along the lower layer air passageway divided by the plates 122a and 122b, and the outdoor air passes through the heater core 102 after passing through the air flow channel 123 formed in the temperature control door 120 while flowing along the upper layer air passageway divided by the plates 122a and 122b, and then, is discharged to the defrost vent 116 or the face vent 117.

Meanwhile, various air conditioning modes may be carried out by adjusting not only the temperature control door 120 but also the plural mode doors. Since such air conditioning modes are well-known, its detailed description will be omitted.

The temperature control door 120 is rotatably operated by an actuator or a cam (not shown).

Moreover, as shown in FIG. 5, the air conditioning case 110 further includes a cold air bypass passageway 112c formed in the lower layer side of the downstream side of the evaporator 101 and bypassing the heater core 102 to increase an air volume in a heating mode, and a door 112d for opening and closing the cold air bypass passageway 112c.

In the cooling mode, the temperature control door 120 closes the front side air passageway 112a of the heater core 102, whereby the indoor air and the outdoor air passed through the evaporator 101 all pass through the air passageway 112b bypassing the heater core 102, and in this instance, the air passageway 112b becomes narrower, and it may cause a reduction of the air volume.

Therefore, besides the air passageway 112b bypassing the heater core 102, the cold air bypass passageway 112c is formed on the partition wall 111b, which connects the top of the evaporator 101 and the top of the heater core 102 with each other to prevent the reduction of the air volume in the cooling mode.

Of course, the cold air bypass passageway 112c is opened by the door 112d only in the cooling mode, but closed in the two-layer air flow mode.

Furthermore, anti-leak device 127 is formed between the temperature control door 120 and the inner surface of the air conditioning case 110 to prevent an air leakage.

The leak preventing device 127 includes an arc-shaped rib 126 protruding on the outer surface of the side wall 124 of the temperature control door 120, and a sliding groove 114 formed on the inner surface of the air conditioning case 110 facing with the rib 126 for slidably inserting the rib 126 thereto.

Figure 1:
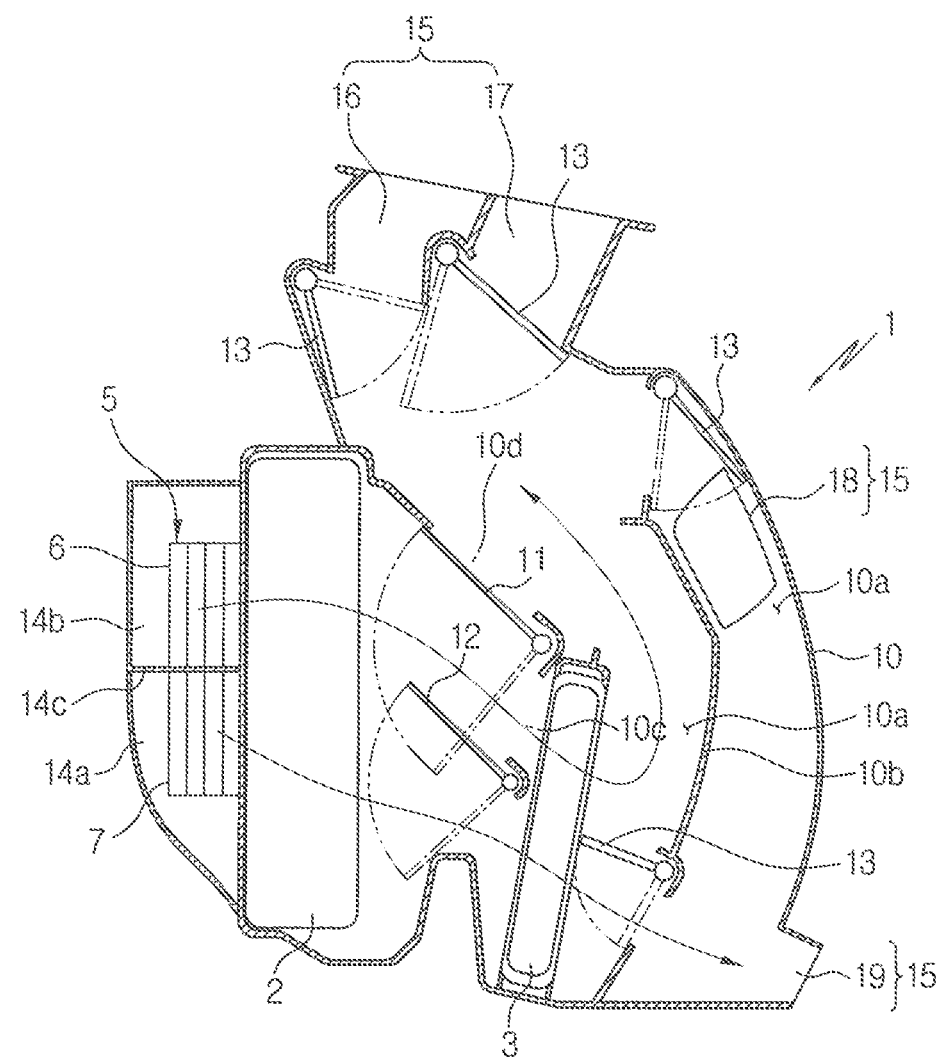
FIG. 1 is a sectional view of a conventional air conditioner having a two-layer air flow structure.

That is, in the conventional air conditioner shown in FIG. 1, a side sealing wall is formed on the inner surface of the air conditioning case 10 and being in contact with the temperature control door 11 to prevent the air leakage when the temperature control door 11 closes the air passageway 10d bypassing the heater core 3, but in the present invention, to close the air passageway 112b, since the auxiliary plate 125 of the temperature control door 120 is in close contact with the partition wall 111b in a state where the bent portion of the auxiliary plate 125 passes over the partition wall 111b but the other end portion does not passes over the partition wall 111b as shown in FIG. 2, the auxiliary plate 125 of the temperature control door 120 may be caught by the side sealing wall if the side sealing wall is formed on the inner surface of the air conditioning case 110.

Therefore, instead of the side sealing wall, the prevent invention has the leak preventing device 127 to prevent the air leakage between the temperature control door 120 and the inner surface of the air conditioning case 110.

Figure 8:
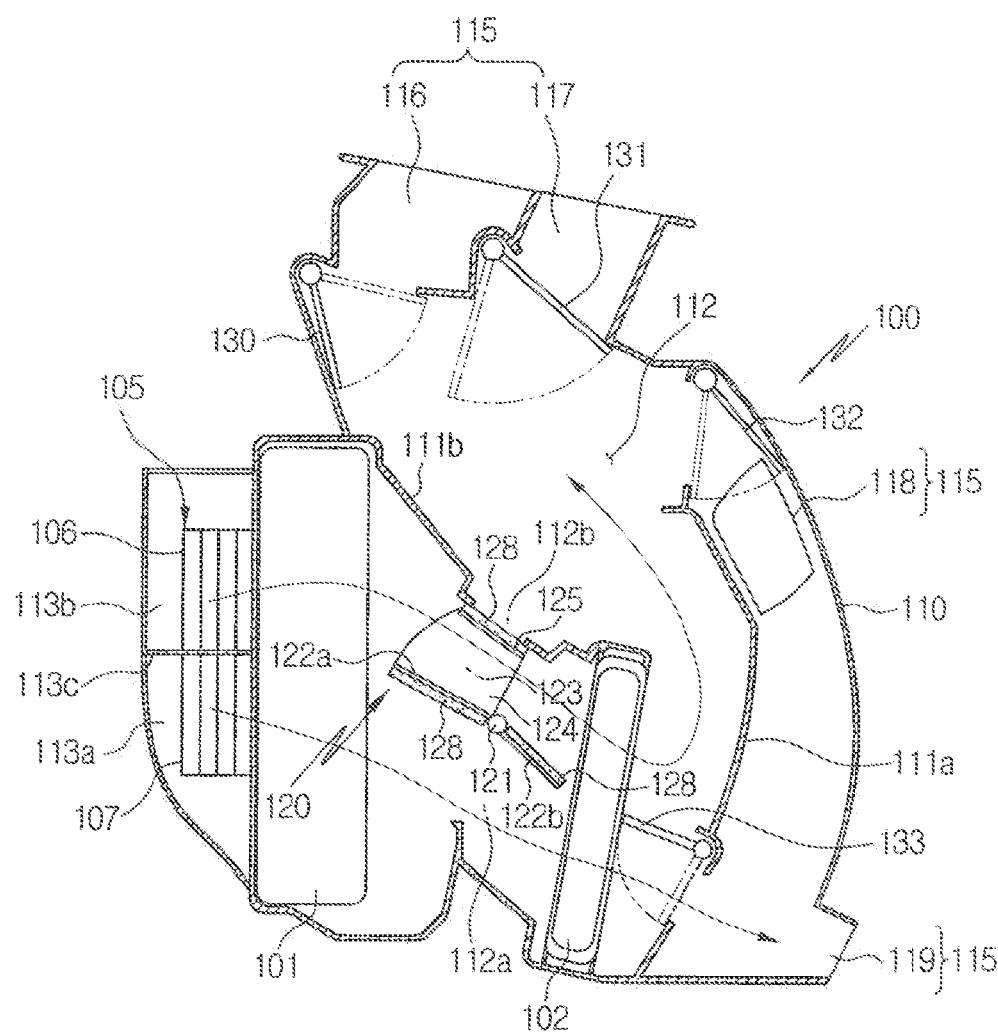
FIG. 8 is a sectional view of an air conditioner having a two-layer air flow structure according to a second preferred embodiment of the present invention in the two-layer air flow mode.
Figure 9:
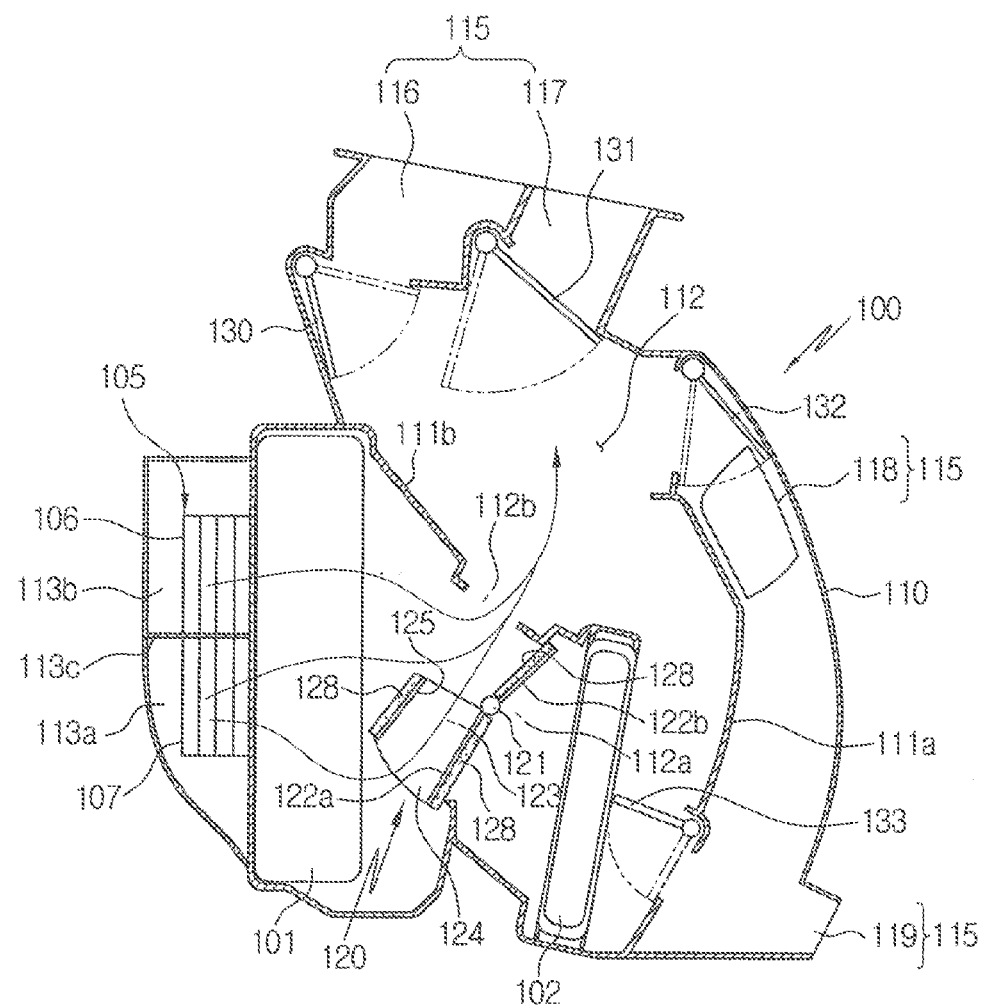
FIG. 9 is a sectional view of an air conditioner having a two-layer air flow structure according to the second preferred embodiment of the present invention in the cooling mode.
Figure 10:
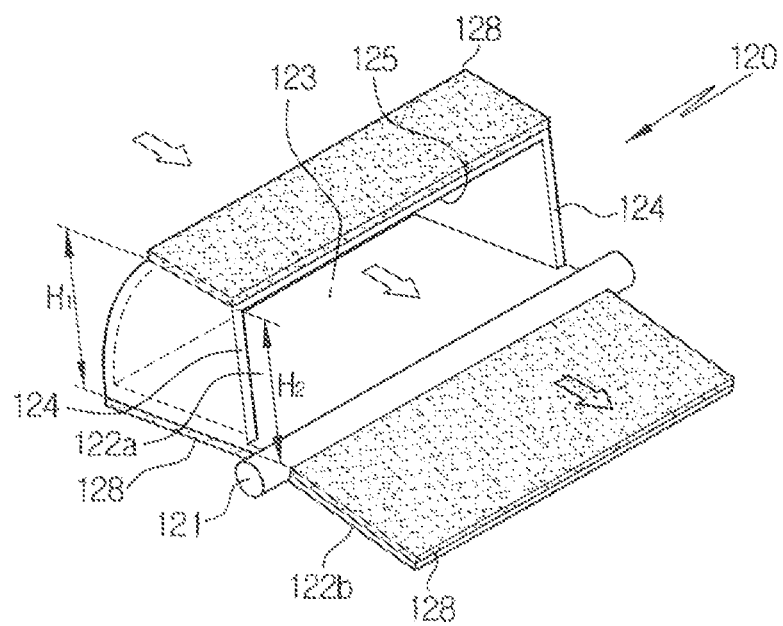
FIG. 10 is a perspective view of a temperature control door of the air conditioner having the two-layer air flow structure according to the second preferred embodiment of the present invention.

FIG. 8 is a sectional view of an air conditioner having a two-layer air flow structure according to a second preferred embodiment of the present invention in the two layer air flow mode, FIG. 9 is a sectional view of an air conditioner having a two-layer air flow structure according to the second preferred embodiment of the present invention in the cooling mode, and FIG. 10 is a perspective view of a temperature control temp door of the air conditioner having the two-layer air flow structure according to the second preferred embodiment of the present invention. In the second embodiment, only different parts from the first embodiment will be described, and repeated description will be omitted.

As shown in the drawings, in the second embodiment, the structure of the temperature control door 120 according to the first embodiment is partially modified, so that the auxiliary plate 125 of the temperature control door 120 can be smoothly in contact with the partition wall 111b without being caught to the partition wall 111b of the air conditioning case 110 when the auxiliary plate 125 of the temperature control door 120 rotates to close the air passageway 112b bypassing the heater core 102.

In addition, the temperature control door 120 according to the second embodiment has the auxiliary plate 125 different from that of the temperature control door 120 according to the first embodiment, and so, hereinafter, the second embodiment will be described only in connection with the auxiliary plate 125.

That is, the auxiliary plate 125 of the temperature control door 120 according to the first embodiment is bent at the center thereof at the predetermined angle, but the auxiliary plate 125 of the temperature control door 120 according to the second embodiment is in the form of a flat plate (in a straight line).

Moreover, to improve sealing efficiency by allowing the upper side edge to be in contact with the partition wall 111b of the air conditioning case 110 having the air passageway 112b when the air passageway 112b bypassing the heater core 102 is closed, the auxiliary plate 125 may be configured in the following three manners.

First, the auxiliary plate 125 is formed inclinedly with respect to the plate 122a.

Second, in connection with end side heights (H1 and H2) ranging from the plate 122a to the auxiliary plate 125, the end side height (H1) which is far from the rotary shaft 121 is larger than the end side height (H2) which is close to the rotary shaft 121.

Third, in the auxiliary plate 125, a turning radius of the end portion which is far from the rotary shaft 121 is larger than a turning radius of the end portion which is close to the rotary shaft 121.

As described above, when the auxiliary plate 125 is formed in the above three manners, the plate 122a and the auxiliary plate 125 are not parallel with each other but an interval between the plate 122a and the auxiliary plate 125 gets wider when it becomes more distant from the rotary shaft 121.

If the plate 122a and the auxiliary plate 125 get closer to each other when they become more distant form the rotary shaft 121, an end portion of the auxiliary plate 125 may be caught to an end portion of the partition wall 111b forming the air passageway 112b while the temperature control door 120 rotates to close the air passageway 112b.

Therefore, the interval between the plate 122a and the auxiliary plate 125 get wider when the plate 122a and the auxiliary plate 125 become more distant from the rotary shaft 121 by the above three manners, whereby the auxiliary plate 125 can exactly open and close the air passageway 112b without being caught to the partition wall 111b of the air conditioning case 110.

In addition, it is preferable that the sealing members 128 are attached only on the upper side surface of the auxiliary plate 125 to prevent the air leakage since the upper side surface is in contact with the partition wall 111b when the auxiliary plate 125 closes the air passageway 112b. So, it is not necessary that the sealing members 128 are attached on the upper and lower side surfaces of the auxiliary plate 125 as described in the first embodiment.

INDUSTRIAL APPLICABILITY

As described above, the present invention is simple in its structure and operation method, reduces manufacturing costs, and provides easiness in adjustment of temperature since it uses only one temperature control door which adjusts temperature and serves as the separation wall for the two-layer air flow structure.

Moreover, the present invention can prevent the reduction of the air volume in the cooling mode since the cold air bypass passageway is additionally formed on the downstream side of the evaporator.

Furthermore, the present invention can prevent the air leakage since it has the leak preventing device formed between the side wall of the temperature control door and the inner surface of the air conditioning case.

In addition, the present invention can improve the sealing efficiency between the air conditioning case and the temperature control door by allowing the upper side edge to be in contact with the partition wall of the air conditioning case, which forms the air passageway 112b, when the air passageway 112b bypassing the heater core 102 is closed, since the auxiliary plate is firmed inclinedly with respect to the plate.

While the present invention has been described with reference to the particular illustrative embodiments it is not to be restricted by the embodiment but only by the appended claims. It is to be appreciated that those skilled in the art can change or modify the embodiment without departing from the scope and spirit of the present invention.

The invention claimed is:

1. An air conditioner for vehicles having a two-layer air flow structure, air conditioner which comprises: an air-conditioning case having an air passageway, an indoor air inlet and an outdoor air inlet formed at an entrance side of the air passageway, the indoor air inlet and the outdoor air inlet being formed separately by a partition wall; and a plurality of air vents formed at an exit side of the air passageway;

an evaporator and a heater core mounted successively in the air passageway of the downstream side of the indoor air inlet and the outdoor air inlet, wherein the evaporator and the heater core are mounted so as to be spaced apart from each other by a predetermined distance;

a temperature control door rotatably mounted in the air passageway and located between the evaporator and the heater core for adjusting temperature by inducing air which has passed through the evaporator to pass through or to bypass the heater core;

whereby indoor air and outdoor air flow through the air passageway in a separated state from each other in a two-layer air flow mode, wherein the temperature control door includes:

a rotary shaft rotatably mounted on the air-conditioning case;

a plate respectively formed on each of both sides of the rotary shaft, one plate being upstream of the rotary shaft and the other plate being downstream of the rotary shaft, each plate having two side edges; and a pair of side walls respectively formed on both side edges of the upstream plate, said pair of side walls having end portions;

an auxiliary plate formed on the end portions of the side walls to open and close an air passageway bypassing the heater core, whereby the upstream plate, the pair of side walls, and the auxiliary plate together form a duct shape so that an air flow channel is formed through an inner space of the duct shape; and, wherein the temperature control door further comprises a leak preventing device, the leak preventing device including an arc-shaped rib protruding from an outer surface of at least one of the side walls of the temperature control door, and a sliding groove formed on an inner surface of the air conditioning case for slidably inserting the rib therein.

2. The air conditioner for vehicles having a two-layer air flow structure according to claim 1, wherein the air-conditioning case further includes a cold air bypass passageway formed at a downstream side of the evaporator to increase an air volume in a cooling mode, and a door for opening and closing the cold air bypass passageway, the cold air bypass passageway bypassing the heater core.

* * * * *